3,363,983
CATALYTIC DECOMPOSITION OF HYDROGEN PEROXIDE AND CATALYST THEREFOR

Richard M. Roberts, Berkeley, Calif., assignor to Shell Oil Company, New York, N.Y., a corporation of Delaware
No Drawing. Continuation of application Ser. No. 829,922, July 27, 1959. This application Dec. 30, 1964, Ser. No. 422,443
2 Claims. (Cl. 23—204)

ABSTRACT OF THE DISCLOSURE

An improved process of decomposing hydrogen peroxide employs as a catalyst a silver-gold alloy containing about 0.1% to about 10% gold by weight.

---

This application is a continuation of copending application Ser. No. 829,922, filed by the inventor on July 27, 1959, now abandoned.

This invention relates to a new method for decomposing hydrogen peroxide and to a new solid contact catalyst for promoting such decomposition rapidly and efficiently.

In a number of different applications, hydrogen peroxide is decomposed to produce a mixture of oxygen and steam. Particularly when used in jet propulsion, rapid and complete decomposition of the peroxide is essential. A number of catalysts have been employed to promote the decomposition in order to insure reliable start-up and smooth operation.

It is an object of the present invention to provide a new and more advantageous catalyst for the decomposition of hydrogen peroxide. Another object is to provide an improved reactor for the catalytic decomposition of hydrogen peroxide into gaseous components. Still another object is the provision of a catalyst mass useful in jet propulsion devices dependent upon hydrogen peroxide decomposition. A further object of the invention is the provision of an efficient method of decomposing hydrogen peroxide, using the before-mentioned catalyst. Still other objects and advantages of the invention will be apparent from the following description of the catalysts and reactors and methods for their use.

In accordance with the invention the foregoing objects are attained through the use as hydrogen peroxide decomposition catalyst of an alloy of silver and gold containing about 0.1% to about 10% by weight of gold, the remainder being essentially silver. Silver catalysts have been previously used for this purpose. However, as far as is known, no silver alloy catalysts have been successfully used for hydrogen proxide decomposition. The prior silver catalysts have suffered from the disadvantage of being subject to quite high rates of silver loss. This is undesirable, not only because it increases the amount of the expensive catalyst which must be provided in order to insure the presence of sufficient silver for effective decomposition throughout the intended life of the catalyst mass, but also because silver lost from a catalyst bed may be deposited downstream in the bed, thereby clogging the catalyst bed and interfering with uniform flow of hydrogen peroxide and its decomposition products. It is a feature of the new catalysts of the invention that loss of catalytic components is very much lower than with the previously used silver catalysts. This is especially the case when the bulk temperature of the hydrogen peroxide being decomposed is in the range 0° to 80° F., as is the case usually when the peroxide first contacts the catalyst. It is in this temperature region that previous silver catalysts suffered greatest losses and greatest difficulty was encountered as a result of irregularity of start-up. With the silver-gold alloy catalysts of the invention, these difficulties are minimized.

Another outstanding advantage of the new catalytic alloys is the marked increase in hydrogen peroxide decomposition rate which they produce compared with pure silver catalysts under the same conditions. The new catalysts thus are more efficient and economical and also provide improved low-temperature starting and less pressure drop difficulties during operation. This is most unexpected since gold is a much poorer catalyst for hydrogen peroxide decomposition and hence would be expected to be detrimental in a silver catalyst.

In normal operation of a solid catalyst bed, such as a silver catalyst bed, four different reaction zones can be distinguished as the hydrogen peroxide being decomposed flows through the bed. In the zone of initial contact of the hydrogen peroxide with the catalyst, the rate of peroxide decomposition is lowest, being dependent on the surface characteristics of the particular catalyst. The heat of hydrogen peroxide decomposition in this zone is transferred rapidly to the peroxide solution by convection so that catalyst surface temperature is only a few degrees above the bulk temperature of the solution. In this first reaction zone the catalyst temperature rises gradually in the direction of flow of the hydrogen peroxide and then increases abruptly at the boundary between the first zone and a second zone in which the catalyst surface temperature is very close to, or the same as, the boiling temperature of the hydrogen peroxide at the existing pressure. In this zone liquid hydrogen peroxide in contact with the catalyst prevents the latter from attaining a higher temperature. This second zone is thus one in which nucleate boiling of the peroxide takes place. The nucleate boiling zone changes into a third zone as the temperature of the peroxide solution continues to rise. This is a zone in which the bulk temperature of the peroxide is so high that liquid contact with the catalyst can no longer transfer all the heat evolved. Consequently, a vapor film forms around the catalyst and film boiling takes place. The rate of peroxide decomposition decreases and the temperature of the catalyst surface increase considerably above the boiling point of the hydrogen peroxide. The temperature of the peroxide finally reaches that at which homogeneous decomposition of both liquid and vapor proceed rapidly in addition to the heterogeneous decomposition which takes place on the container surfaces as well as the catalyst. This is the fourth and final reaction zone in which the decomposition is completed.

The kinetics of the reaction in the first zone largely determine the starting characteristics of the hydrogen peroxide in a given rocket motor catalyst bed. The alloy catalysts of the present invention have the unexpected property of markedly increasing the hydrogen peroxide decomposition rate in the first or low-temperature reaction zone of a solid catalyst bed by shifting the nucleate boiling zone to a lower hydrogen peroxide bulk temperature. The control of decomposition rate thus made possible is especially advantageous in improving low-temperature starting of rocket motors or other jet propulsion devices for instance.

The silver-gold alloy catalysts can be used in various forms. One especially advantageous modification is as wire composed of or coated with this alloy. A particularly useful catalyst wire can be economically produced by electroplating silver on a base metal wire, for instance, copper or steel or similar wire, then electroplating the required amount of gold onto the silver and afterward heating the plated wire to a temperature at which diffusion of the gold into the silver takes place. Heating for four hours at 900° C., for example, will produce a homogeneous solid solution of gold in silver which is a very effective hydrogen peroxide catalyst. Alternatively the catalyst wire can be made by drawing from the alloy which can be made in an analogous manner or by melting together the gold and silver and cooling slowly enough to insure the production of the homogenous single-phase alloy product which is desirable regardless of the form in which the catalyst is to be used. Screen made of such alloy wire of about 0.01 to about 0.04 inch in diameter, for example, is suitable, especially when woven so as to provide a fractional free area of about 0.3 to 0.4. Catalyst beds having outstanding advantages can be fabricated from these screens by superimposing them, preferably with interspersed supporting screens of a more rigid metal such, for instance, as stainless steel, Monel, or the like. This type of catalyst bed can be advantageously used in a reaction chamber having an inlet for liquid hydrogen peroxide feed at one end and an outlet for the hydrogen peroxide decomposition products at the other and the catalyst positioned therebetween.

There are special advantages in constructing hydrogen peroxide decomposition reactors with the new catalyst at the inlet end followed by a conventional hydrogen peroxide decomposition catalyst such, for example, as a silver catalyst of the kind heretofore used. With this arrangement the advantage of lower catalyst loss can be achieved with a smaller amount of the new alloy catalyst and without serious sacrifice of hydrogen peroxide decomposition rate. Usually about one-tenth to one-fourth of the total catalyst as silver-gold alloy gives good results in this modification of the invention. Among the other known hydrogen peroxide decomposition catalysts which can be used in combination with silver-gold alloy catalyst in this modification of the invention are, for instance, calcium permanganate, manganese dioxide, alkali metal permanganates, especially sodium or potassium permanganate, iron oxide, platinum or the like. U.S. Patent 2,721,788 describes one suitable method for constructing reactors in which the new silver-gold alloy catalysts of the invention can be used with or without these conventional hydrogen peroxide decomposition catalysts.

Instead of using the new catalysts in the form of screens they can be employed as pellets consisting of or coated with the silver-gold alloy catalyst composition. U.S. Patent 2,865,721 describes a suitable arrangement for using this form of the new alloy catalyst. Still other modifications of the catalysts of the invention can also be used satisfactorily.

Typical advantages of the invention are shown by the following tests of decomposition of hydrogen peroxide at atmospheric pressure when using an alloy of 1% gold and 99% silver in comparison with a pure silver catalyst at different bulk peroxide temperatures. The tests were all made in a static system at constant temperature and essentially constant hydrogen peroxide concentration. Each test was carried out in a well-stirred flask charged with 100 ml. of 90% electrolytic hydrogen peroxide and catalyst in the form of wire of 0.014 inch diameter which had been cleaned in 90% $H_2O_2$. The oxygen evolution during a standard period of 4000 seconds was measured and the catalyst was weighed before and after the tests to determine the amount lost in the operation.

| Example No. | Temperature (° F.) | Amount of Catalyst (grams per 100 grams $H_2O_2$) | Oxygen Evolution (cc. per sec. per gram catalyst) | | Catalyst Loss (weight percent) | |
|---|---|---|---|---|---|---|
| | | | Silver Catalyst | Alloy Catalyst | Silver Catalyst | Alloy Catalyst |
| I | −13 | 0.01361 | | 4.05 | | 11.0 |
| IA | −12 | | 1.11 | | 20.0 | |
| II | +5 | 0.00548 | | 184 | 48.0 | 9.5 |
| IIA | +9 | | 2.6 | | 51.0 | |
| III | +14 | 0.00425 | | 184 | 61.0 | 7.3 |
| IIIA | +19 | | 4.1 | | 69 | |
| IVA | +30 | | 5.9 | | 81 | |
| IV | +34 | 0.00673 | | 218 | | 7.1 |
| VA | +52 | | 12.5 | | 100 | |
| V | +68 | 0.00461 | | 170 | | 6.1 |

The much faster generation of heat in decomposing hydrogen peroxide with the alloy catalysts of the invention instead of the conventional pure silver catalyst is shown by the following results of tests made with these catalysts, the alloy being 1% gold and 99% silver. The tests were carried out in a specially constructed stirred Dewar flask provided with a glass-enclosed single-junction iron-constantan thermocouple to measure the bulk hydrogen peroxide temperature. In the tests the initial temperature of the hydrogen peroxide was 32° F. and equal weights of the catalysts were used. Losses in catalyst weight were determined at the end of the operations.

| Example No. | Catalyst | Temperature (° F.) of the Hydrogen Peroxide after a Decomposition Time of— | | | | | | | | Loss in Weight of Catalyst (Percent) |
|---|---|---|---|---|---|---|---|---|---|---|
| | | 0 min. | 3 min. | 6 min. | 10 min. | 15 min. | 20 min. | 25 min. | 30 min. | |
| VI | Pure silver | 32 | 33 | 34 | 35.5 | 37 | 39 | 41 | 43 | 45.4 |
| VIA | Silver and 1% gold alloy. | 32 | 51 | 73 | 101 | 131 | 157 | 178 | 192 | 2.0 |

Tests of decomposition of 90% hydrogen peroxide at 34° F. by the method of Examples I–VA but using catalysts containing different amounts of gold gave the following results:

| Example No. | Catalyst | Initial Amount of Catalyst (grams per 100 ml. of 90% $H_2O_2$) | Oxygen Evolved in 4,000 secs. (liters per 100 ml. $H_2O_2$ charged per g. catalyst) | Percent Weight Loss of Catalyst |
|---|---|---|---|---|
| VII | Pure silver | 0.02714 | 16.6 | 81 |
| VIII | 5% gold, 95% silver | 0.00492 | 688 | 2.2 |
| IX | Same, annealed 4 hrs. at 900° C | 0.00421 | 475 | 3.6 |
| X | 10% gold, 90% silver | 0.00642 | 103 | 1.2 |
| XI | 20% gold, 80% silver | 0.09714 | 0.64 | 0.5 |

In the tests with the alloys containing 5 and 10% gold, it was observed that in the temperature region near 32° at essentially constant peroxide concentration. The following are results obtained in operations at 800 p.s.i.g.

| Example No. | Catalyst | Temperature (° C.) | | Surface Area (sq. in.) | Rate of Hydrogen Peroxide Decomposition [1] | Rate of Catalyst Loss [2] |
|---|---|---|---|---|---|---|
| | | Peroxide Solution | Catalyst | | | |
| XII | Pure silver | 86 | 296 | 0.1148 | 8.95 | 42 |
| XIIA | Alloy, 1% gold, 99% silver | 83 | 299 | 0.1176 | 25.8 | 11 |
| XIII | Pure silver | 103 | 296 | 0.1278 | 12.3 | 43 |
| XIIIA | Alloy, 1% gold, 99% silver | 104 | 309 | 0.1254 | 16.1 | 11 |

[1] Liters of $O_2$ produced per minute per square inch catalyst surface.
[2] Lbs. $\times 10^{-9}$ per square inch catalyst surface per second.

F. there was a tendency for the hydrogen peroxide decomposition to proceed in periodic bursts of higher and lower rates. On this account it is generally preferable to use gold-silver alloys containing not more than about 3% by weight of gold. Most advantageously alloys containing about 0.25% to about 2.5% by weight of gold with the remainder being essentially silver are used in the invention.

Comparative tests of decomposition at high pressure show the same improvement from the use of the new alloy catalysts as was found in the foregoing tests at atmospheric pressure. In these tests 90% electrolytic hydrogen peroxide was fed at the rate of 45 grams per minute through stainless steel tubing in a water bath which heated the peroxide to reaction temperature. The preheated peroxide flowed upward under pressure into contact with the catalyst which was in the form of ⅛-inch rods of silver or gold-silver alloy in a ³⁄₁₆-inch tube. The resulting mixture of hydrogen peroxide decomposition products passed out through a cooler and back-pressure regulator to a liquid accumulator and gas meter. In this way hydrogen peroxide decomposition rates and catalyst loss rates were determined at constant temperature and pressure and at essentially constant peroxide concentration.

While use of the new alloy catalysts for decomposition of concentrated hydrogen peroxide has been emphasized in the foregoing examples, the invention is not restricted thereto since excellent results have also been obtained in decomposing dilute hydrogen peroxides, for instance of 12% concentration, in the same way. This makes the invention advantageous in decomposing waste hydrogen peroxide regardless of its concentration, so that it may be disposed of safely and economically.

It will thus be seen that the invention has many applications in which it offers material advantage over prior methods of hydrogen peroxide decomposition. The invention is not limited to the examples which have been given by way of illustration only, nor by any theory proposed in explanation of the improved results which are obtained.

I claim as my invention:

1. A method for decomposing hydrogen peroxide which comprises contacting said peroxide with a catalyst the active component of which consists essentially of a silver-gold alloy containing about 0.1% to about 10% gold by weight.

2. A method in accordance with claim 1 wherein the catalyst has a surface of silver-gold alloy comprising approximately 99% silver and 1% gold.

References Cited

UNITED STATES PATENTS

| | | | |
|---|---|---|---|
| 2,721,788 | 10/1955 | Schad | 23—204 |
| 2,739,042 | 3/1956 | Corey et al. | 23—207 |
| 2,871,104 | 1/1959 | Rust | 23—207 |
| 2,138,583 | 11/1938 | Langwell et al. | 252—476 |
| 2,951,046 | 8/1960 | Laxton | 252—476 |

OTHER REFERENCES

Mellor: "Comprehensive Treatise on Inorganic and Theoretical Chemistry," vol. 3, p. 575 (1923).

OSCAR R. VERTIZ, *Primary Examiner.*

MILTON WEISSMAN, *Examiner.*

H. S. MILLER, *Assistant Examiner.*